United States Patent [19]
McMillen et al.

[11] Patent Number: 5,483,535
[45] Date of Patent: Jan. 9, 1996

[54] COMMUNICATIONS NETWORK INTERFACE, AND ADAPTER AND METHOD THEREFOR

[75] Inventors: Keith A. McMillen, Berkeley; David Simon, Palo Alto; Matthew Wright, Berkeley, all of Calif.

[73] Assignee: Zeta Music Partners, Oakland, Calif.

[21] Appl. No.: 374,148

[22] Filed: Jan. 17, 1995

[51] Int. Cl.[6] ........................................... H04L 5/22
[52] U.S. Cl. .................. 370/85.1; 370/85.5; 340/825.05
[58] Field of Search ................................ 370/85.1, 85.4, 370/85.5, 85.9, 85.11, 85.12, 85.15; 340/825.05, 825.5

[56] References Cited

U.S. PATENT DOCUMENTS

| | | | |
|---|---|---|---|
| 4,566,097 | 1/1986 | Bederman | 370/85.5 |
| 4,736,368 | 4/1988 | Szczepanek | 370/85.5 |
| 4,819,229 | 4/1989 | Pritty et al. | 370/85.5 |
| 5,274,637 | 12/1993 | Sakamura et al. | 370/85.5 |

*Primary Examiner*—Melvin Marcelo
*Attorney, Agent, or Firm*—Dougherty, Hessin, Beavers & Gilbert

[57] ABSTRACT

An interface for a peer-to-peer communications network, such as a token ring network, uses a master-slave serial communications controller and an adapter to enable the interface to operate in a peer-to-peer mode on the network.

8 Claims, 4 Drawing Sheets

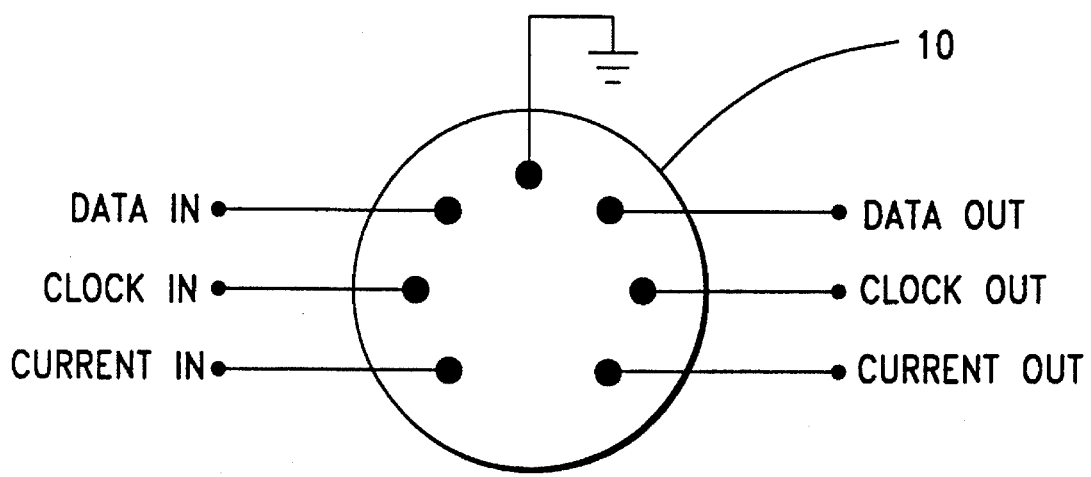
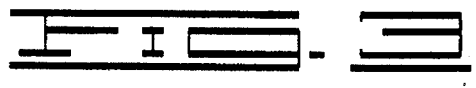
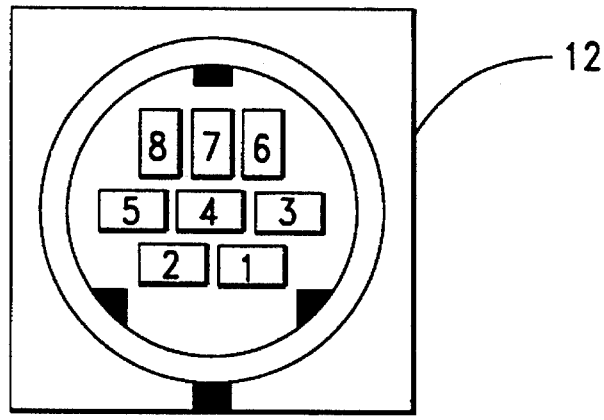
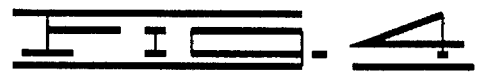

COMMUNICATIONS NETWORK INTERFACE, AND ADAPTER AND METHOD THEREFOR

BACKGROUND OF THE INVENTION

This invention relates generally to interfacing a station with a communications network. In a particular aspect of the preferred embodiment of the invention, a device operating in a master-slave mode of operation is adapted to a token ring network operating in a peer-to-peer mode.

An example of a communications network with which the present invention can be used is one which connects one or more musical instruments, computers and synthesizers so that the connected equipment can be used to create and play synthesized music. A specific implementation of such a network is a local area network that uses the token passing access method, whereby the network can be referred to as a token ring network.

A token is typically a series of bits in a predetermined unique format. In a token ring network, the token passes sequentially from station to station until a station seizes the token and transmits its own data. Other stations on the network "listen" to the transmitted data, utilize it if it is addressed to them, and pass the data on. When the transmission concludes, the seizing station relinquishes the token by transmitting the token format back onto the network. In such a network, data flows circularly from the current token-holder around the ring.

To enable network transmissions to be recognized, they need to conform to some standard. A well-known standard is the Synchronous Data Link Control (SDLC) protocol. SDLC is a bit-oriented synchronous protocol.

A device that works with this protocol is the Zilog 8530 serial communications controller. One of these devices can operate in an SDLC loop mode to interface a station to a network having a ring topology. The 8530 serial communications controller in SDLC loop mode is designed for use as part of a master-slave network, in which each message is either from the ring master to a slave or from a slave to the ring master. In this configuration, while a slave sends a message to a master, the master sends back all logic ones ("1") to the slave.

This master-slave arrangement, however, is not desirable for some applications. With regard to the music synthesis network mentioned above, peer-to-peer communications, wherein any station on the network can communicate directly with any other station without going through a master station, is preferred because of, for example, the greater flexibility of communication due to the direct station-to-station communication. In peer-to-peer communications, while one device is sending data, there is not another device on the ring sending it all ones. Instead, the data sent by that device goes all the way around the ring and back to the sender. Thus, the 8530 chip operating in SDLC loop mode has not been useful in peer-to-peer communications because it would not receive the expected stream of ones during transmission. Instead it would receive its transmitted data back so that it would likely transmit an improper format at the conclusion of its transmission.

One way to implement a peer-to-peer token ring network is to use an IBM Token Ring chip; however, this device is relatively expensive (e.g., about $35-$80) compared to the 8530 serial communications controller (e.g., about $3). Thus, it would be desirable to be able to connect a station to a peer-to-peer token ring network through an interface using the less expensive, but heretofore inapplicable master-slave device. This is accomplished by the present invention.

SUMMARY OF THE INVENTION

The present invention overcomes the above-noted and other shortcomings of the prior art by providing a novel and improved communications network interface and adapter and method therefor.

In its preferred embodiment, the present invention enables a peer-to-peer token ring network to be implemented using a relatively inexpensive master-slave serial communications controller (such as the aforementioned approximately $3 8530 device) to connect a station at any node of the network. To accomplish this, an adapter transmits all logic ones to the serial communications controller when the controller is transmitting to the network. This satisfies the master-slave criterion of the serial communications controller while the adapter maintains peer-to-peer communication with the network. When the serial communications controller reaches the end of its transmission frame, it does the usual thing under master-slave operation: it sends a flag, then reconnects its input to its output. This produces a flag followed by ones, which is the predetermined unique token format desired. The adapter transfers this data to the network and looks for its return. Until it detects the flag from the network, it continues transmitting ones to the serial communications controller. Once the adapter detects the flag, it reconnects the controller to receive the signals from the network.

Accordingly, the present invention provides a communications network interface adapter, comprising means, adapted to be connected to a communications network and to a serial communications controller at a node of the communications network, for transferring network data to the serial communications controller during a receive mode of operation. The adapter further comprises means, adapted to be connected to the communications network and to the serial communications controller at the node of the communications network, for sending predetermined signals instead of network data to the serial communications controller during a transmit mode of operation.

The present invention also provides an interface for a token ring network. The interface comprises a serial communications controller having a master-slave mode of operation. The interface also comprises the aforementioned adapter preferably embodied in a programmable logic device connected to the serial communications controller. This device is programmed to adapt the serial communications controller to operate on a peer-to-peer token ring network when the serial communications controller operates in the master-slave mode. The programmable logic device has a receive mode of operation. In this mode a signal received by the programmable logic device from a connected token ring network is transferred to the serial communications controller, and a signal received by the programmable logic device from the serial communications controller is transmitted onto the connected network. The programmable logic device also has a transmit mode of operation. In this mode a predetermined signal is sent to the serial communications controller from the programmable logic device in place of a signal received by the programmable logic device from the connected network, and a signal received by the programmable logic device from the serial communications controller is transmitted onto the connected network.

The present invention still further provides a method of communicating a station in a peer-to-peer mode on a token ring network. The method comprises: (a) receiving a signal from a token ring network; (b) transferring the received signal to a serial communications controller operating in a master-slave mode; (c) receiving a responsive signal from the serial communications controller; (d) transmitting the responsive signal onto the token ring network; and repeating steps (a) through (d) until a predetermined token defined by a plurality of signals on the network is seized by the serial communications controller. When this occurs the following steps are performed until the token is passed on by the serial communications controller: receiving a signal from the token ring network; sending a predetermined signal to the serial communications controller to emulate to the serial communications controller master-slave operation during transmission by the serial communication controller; receiving a signal from the serial communications controller; and transmitting the signal received from the serial communications controller onto the token ring network.

Therefore, from the foregoing, it is a general object of the present invention to provide a novel and improved communications network interface and adapter and method therefor. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 4 depicts an end coupling of another type of cable used to link interfaces of the network.

FIG. 6 is a flow chart of a program for the adapter of the interface of the present invention.

DETAILED DESCRIPTION OF THE PREFERRED EMBODIMENT

Figure 1:
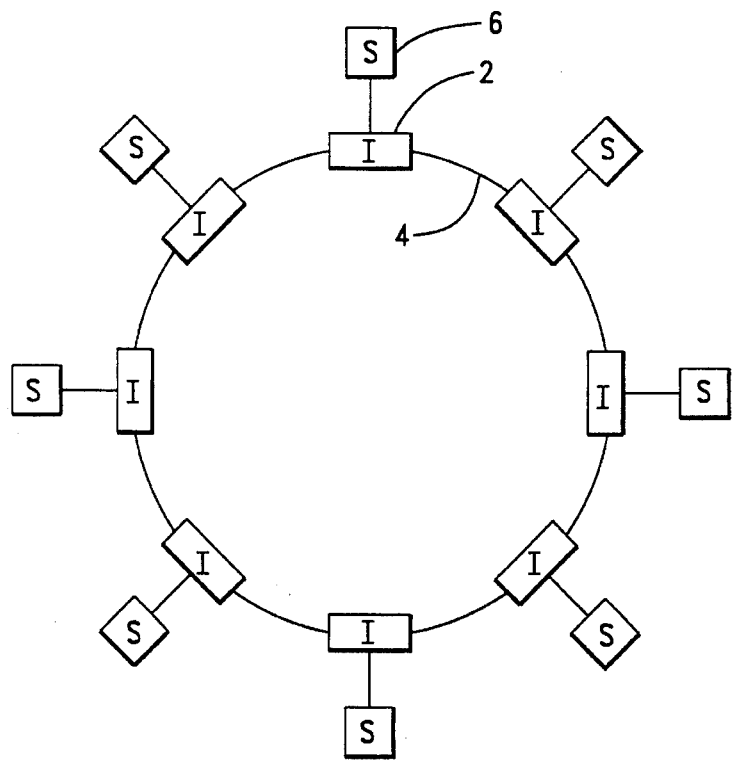
FIG. 1 is a schematic and block drawing representing a token ring network in which the interface, adapter and method of the present invention can be used.

The present invention will be described with reference to a token ring network, a basic form of which is illustrated in FIG. 1. The network includes two or more interfaces 2 connected together by point-to-point lines implemented such as by known cables 4 that comply with an applicable standard (e.g., IEEE 802.5). Each interface 2 connects a respective station 6 into the network. A station 6 includes particular equipment which is to utilize or generate the information communicated over the network. An example of such equipment is a musical instrument, synthesizer or computer in a music synthesis local area network that uses the ring topology and the token passing access technique.

Although the present invention is not limited to a specific communications protocol, the preferred embodiment of the invention has been developed for use in a token ring network operating under a new standard known as the Zeta Instrumental Processor Interface developed by Zeta Music Partners, a partnership between Zeta Music Systems, Inc. and Gibson Ventures, Inc. A brief explanation of this will be given before further describing the present invention.

Zeta Instrumental Processor Interface

The network specification for this standard defines a collection of protocols that allow musical instruments, synthesizers, mixer boards, lighting controls, and other similar devices to communicate with one another.

The protocols constitute a stack that conforms to the OSI model. "OSI" stands for "Open Systems Interconnection." OSI was developed by the International Standards Organization as a model for how to divide computer networks into various conceptual layers. The physical and data link layers have been fully defined for the Zeta Instrumental Processor Interface. In addition a network-layer naming service has been specified and various application-layer protocols have been defined. Routing, transport, session, and presentation protocols are not specified, as there is no immediate need for them, but hooks have been left to allow the inclusion of such protocols.

As of 1994 the following are some features of the Zeta system:

peer-to-peer architecture—Any device can send messages directly to any other device on the ring, or to all devices at once. Up to 253 devices can be on the ring.

low per-node cost—The hardware for an interface used to connect to the network at a node is relatively inexpensive (e.g., less than $5) because the nodal interface can be implemented by the present invention.

compatibility—The Zeta system works with other protocols. Specific provision has been made to carry MIDI data over the data-link protocol used in the Zeta system. Hooks have been left to run other protocols as the market requires. (It also uses SDLC conventions.)

open architecture—Zeta Music Partners has published the draft specifications for the protocols and will continue to publish revised specifications.

efficiency—The protocols allow the most common information to be passed in very small frames. The token passing network scheme uses most of the network bandwidth for transmitting data.

determinism—The token passing ring guarantees that each node will get a chance to send data whenever the token comes around the ring. Once a device has the token, the data that it transmits will arrive before a certain time since no other device has permission to talk while another holds the token.

fault tolerance—The network does not fail if one of the nodes fail as a failed node is automatically bypassed.

OSI—The protocols conform to the OSI model, allowing functionality with other networks such as Ethernet or FDDI.

speed—The network operates at speeds from 250 KHz and up (presently available hardware will support up to 20 MHz). Data rate is variable depending on the capability and need of all the devices on the network. Initial turn-on baud rate is 250K baud, but the software has a protocol for bringing the baud rate up to any speed that all devices can handle.

small processor load—each host processor is interrupted only when it receives a message addressed to it. Only the network monitor device must see every message.

minimal cabling required—each node needs only one cable to connect it to the network.

The protocols are divided into layers according to the OSI model. The following sections summarize network operations at the various layers.

physical layer

Figure 2:
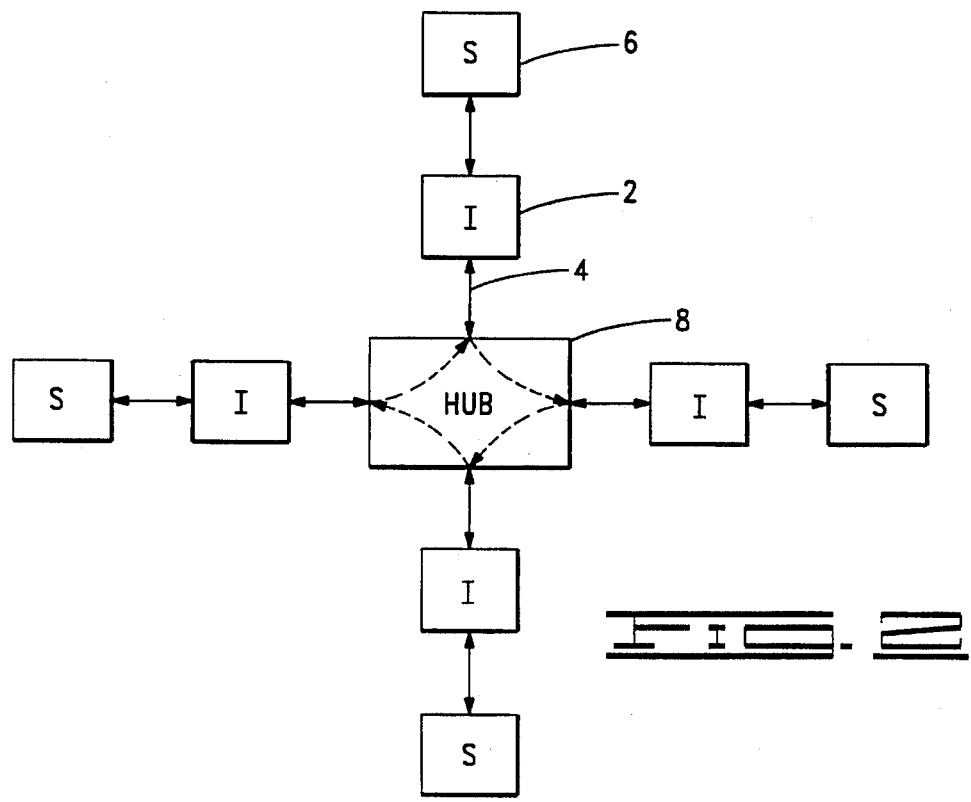
FIG. 2 is a schematic and block drawing representing a star configured token ring network.

Logically, the nodes are connected in a ring, in which each device passes data to the next one around the ring. Physically, the devices are connected in a star-shaped configuration in which each device is connected to an active "hub" at the center of the star. The network is laid out as a star-shaped token passing ring such as illustrated in FIG. 2, wherein a network of four nodes is depicted (a network can have a minimum of two nodes). At the center of the star is an active hub 8 (or a group of hubs) that has two functions: it connects the devices on the ring to one another and it monitors the general health of the network. The hub 8 is a conventional apparatus and is connected to the interface 2 of each node by a respective cable 4 as well-known in the art. The hub 8 maintains the logic of a ring by sending the data coming from each device out to the next device in the star. The hub 8 can include bypass switches (not shown) which close to bypass a node that is not functioning, thereby maintaining the closed loop communication path of the ring.

Figure 3:
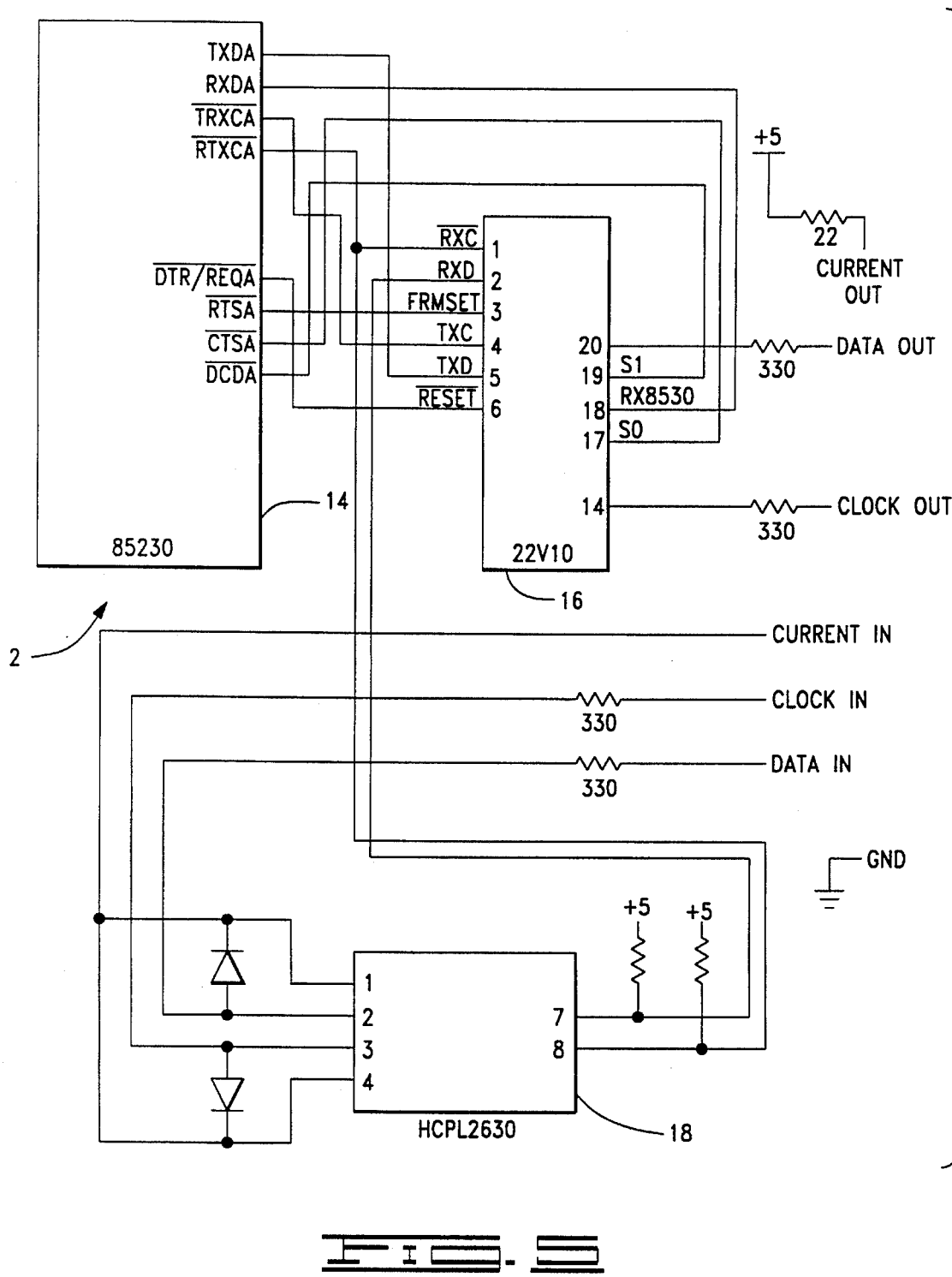
FIG. 3 depicts an end coupling of, and signals communicated over, a cable used to link interfaces of the network.

Each interface 2 is connected to the hub 8 by a seven-wire cable 4 with two directions of data flowing through it. Each direction has clock, data, and current lines; the seventh wire is for shielding the entire cable. It would be possible to encode the clock onto the data line, eliminating the need for the clock wire and associated opto-isolator (in the interface 2). The receiving device could use a digital phase locked loop for clock recovery. However this would limit maximum data rates to approximately 1M and reduce communications reliability so the separate clock lines are preferred. Each cable end is terminated with a 7-pin DIN plug 10 schematically illustrated in FIG. 3.

A respective cable can alternatively be terminated with an eight-pin mini-DIN connector 12 (FIG. 4), to allow the respective interface 2 to be built into laptop computers. In this case the signal designations for the pin out configuration of FIG. 4 are as follows:

pin 1 clock out pin 2 clock in pin 3 current out pin 4 shield pin 5 current in pn 6 data out pin 7 no connection pin 8 data in By having one cable 4 carry information in two directions, each interface 2 needs only one female seven-pin DIN connector. The hub 8 has multiple female seven-pin DIN connectors, all equivalent. An interface 2 can then be attached to a hub 8 using a male-to-male seven-pin DIN cable 4. Multiple hubs 8 can be attached to one another in the same way.

The hub 8 preferably has two light-emitting diodes (LEDs) per plug, with the following respective meanings:

an interface is connected and sending a clock.

the connected interface is sending data.

The network preferably uses an opto-isolated current loop. Up to 253 nodes can be connected on a single ring.

In addition to providing connectivity, the hub 8 implements a monitoring function to keep the network running smoothly. There is no technical reason why the monitor device has to be the same as the hub 8, but by making the hub 8 the monitor in the preferred embodiment of the Zeta system, non-monitor-capable devices can be used at the nodes. The practical implication of this preferred implementation is that two non-monitor-capable devices cannot be directly connected (of course, if there are three or more devices, a hub is required anyway just for connectivity.)

The monitor device provides the protocol for picking a clock speed for all ring communications; devices on the ring can negotiate the speed of the clock. The monitor must resynchronize the data to deal with a situation wherein the clock the monitor uses to send data is not in phase with the clock it uses to receive data. Furthermore, the monitor ensures that the token is circulating and that no garbage circulates on the ring; if the token is lost, the monitor must detect this and put a new token on the ring. Another monitoring function is the implementation of a sixteen-bit delay in the ring.

It is possible to have multiple monitor-capable devices; the software protocols elect a single monitor from among the qualified devices. It is also possible to have passive hubs that provide connectivity with no monitor capabilities.

When a ring of devices is formed, an automatic start-up sequence begins. First, the ring monitor is elected. The clock rate is determined, and all the other overhead of the network is taken care of automatically within a second of connecting the ring.

data link layer

The data link layer of the Zeta system provides the following services in addition to sending and receiving frames:

It ensures that data has been received correctly by checking the Cyclical Redundancy Checking (CRC) data included with each frame and discarding frames on which the CRC is bad.

It sends acknowledgements of received frames (at the option of the senders).

It establishes an address for its device that is unique among devices on the network.

It negotiates with the other devices on the network to determine the clock speed at which the network runs.

The data link layer in the device monitoring the ring also ensures that there is a token on the ring and that no garbage is on the ring, and it notifies other devices when the clock speed is changing.

application layer

There can be several application layer protocols in the Zeta system. They include:

Music Parameter Description Language (a language for describing music)

MIDI unrestricted binary data, such as sample dumps, memory dumps, inter-computer communication, etc.

mixer automation, lighting, and effects control machine control/synchronization virtual reality other layers There is also a network-layer naming protocol to allow devices on the network to find one another either by name or by any of a large and expandable list of characteristics. For example, the naming protocol allows a device to search the network for "synthesizers capable of playing at least twelve notes and that can accept data at 1.0 Mb per second."

Hooks have been left for other protocol layers.

Although the present invention can be used in the foregoing Zeta system, the invention itself pertains only to the interface 2 which will now be described in detail.

Interface 2

Figure 5:
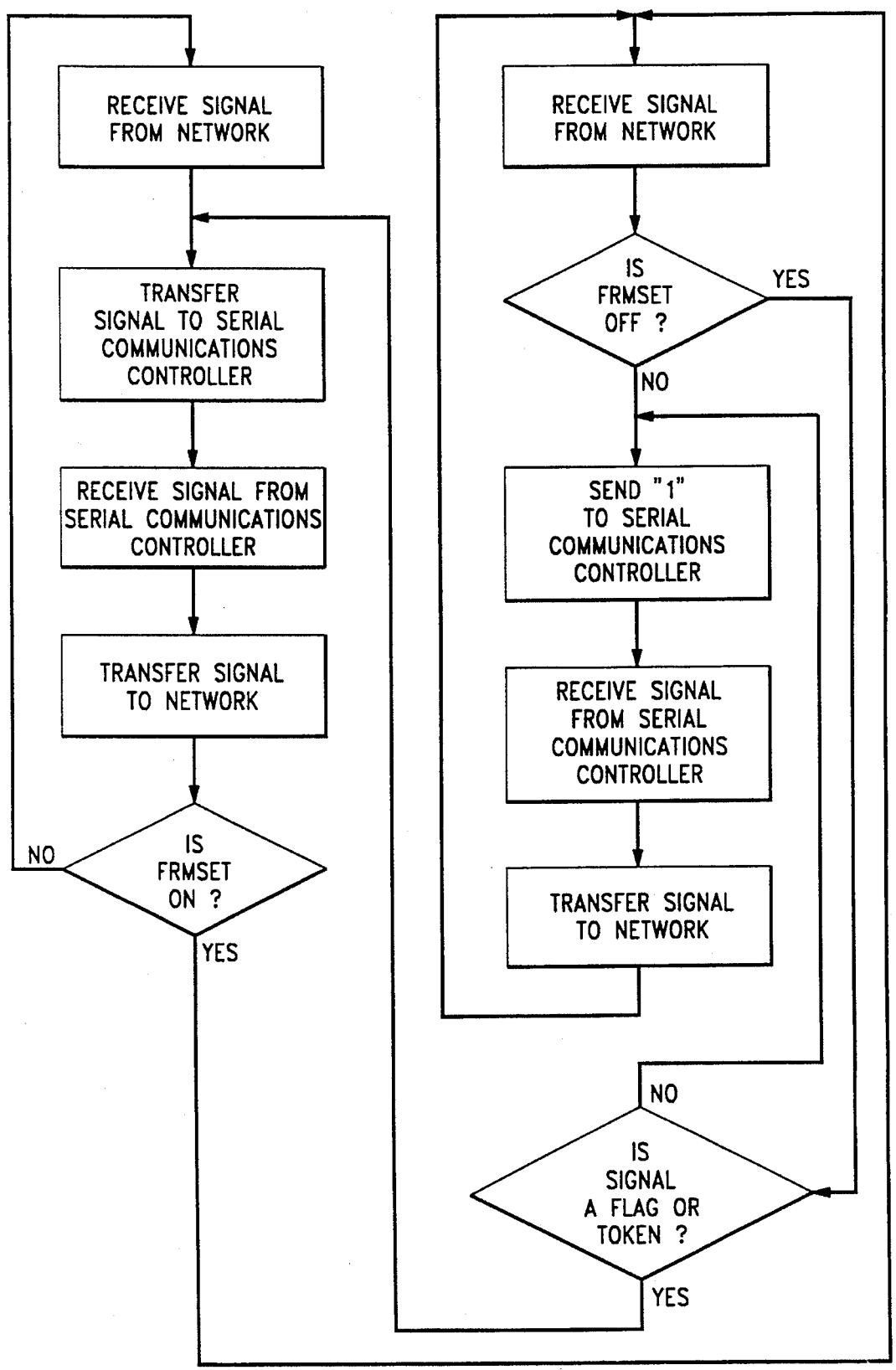
FIG. 5 is a schematic circuit diagram of the preferred embodiment interface, including the adapter, of the present invention.

Referring to FIG. 5, the interface 2 of the present invention comprises a serial communications controller 14 having a master-slave mode of operation. The interface 2 of the present invention also comprises an adapter 16 which adapts the master-slave serial communications controller 14 to the peer-to-peer token ring network described above. In a particular implementation, the interface 2 further comprises an isolating input coupling device 18.

serial communications controller 14

The preferred implementation of the interface 2 is based on the 8530, an inexpensive serial communications controller chip available from Zilog and Advanced Micro Devices, or on one of its close relatives (the 85230 is shown in FIG. 5 and is preferred, but "8530" will be used herein to generally refer to this family of particular devices). The 8530 running in "SDLC loop mode" implements most of the physical layer of the previously described Zeta system as well as some of its data link layer protocol. The 8530 automatically handles most of the SDLC protocol: device addressing, host processor interrupts only for matched addresses, data framing, CRC error checking, and hardware arbitration of who gets to talk when. It provides automatic flag sending and zero insertion. It has a four byte first-in, first-out buffer and supports DMA (direct memory access). Data is sent packaged in SDLC frames. The SDLC frames have the following format:

2 or more flags (binary 01111110), followed by data (characterized by never having more than five consecutive 1's), followed by a closing flag (binary 01111110)

A frame may be preceded by any number of 1's, and a frame may be aborted at any time by sending the abort or end-of-poll (EOP) character (binary 01111111, wherein the "0" is the leading bit in the serial stream; it is this bit pattern that is the "token" in the particular implementation described herein).

More particularly, in conventional SDLC loop mode the 8530 listens to the messages being sent around the network, uses them if it is addressed, and passes these messages to the rest of the loop by retransmitting them with a one-bit time delay.

When an 8530 has a message to transmit and recognizes an EOP character on the line, it changes the last binary 1 of the EOP to a 0 before transmission. This has the effect of turning the EOP into a flag sequence. The 8530 then outputs its message. The message terminates with a flag and an EOP.

The 8530 can be adapted for the particular Zeta system described above by software which, although not forming part of the present invention:

provides an interrupt routine for the 8530 that pushes the necessary registers, calls the routine provided by Zeta, and resets any interrupt control hardware other than that in the 8530; and sets up a timer, handles the timer interrupt, pushes the registers, and calls other provided routines.

adapter 16

Broadly, the adapter 16 for the communications network interface 2 of the present invention comprises means, adapted to be connected to the communications network and to the serial communications controller 14 at a node of the communications network, for transferring network data to the serial communications controller during a receive mode of operation. The adapter 16 further broadly comprises means, adapted to be connected to the communications network and to the serial communications controller 14 at the node of the communications network, for sending predetermined signals instead of network data to the serial communications controller 14 during a transmit mode of operation. These means are implemented in the preferred embodiment of the present invention by a programmable logic device programmed in accordance with the explanation of the invention contained in this specification (a specific program is listed at the end of this specification).

The programmable logic device is connected to the serial communications controller 14 to adapt it to operate on the peer-to-peer token ring network when the serial communications controller 14 operates in the aforementioned master-slave mode. The programmable logic device has a receive mode of operation wherein a signal received by the programmable logic device from a connected token ring network is transferred to the serial communications controller 14 and further wherein a signal received by the programmable logic device from the serial communications controller 14 is transmitted onto the connected network. The programmable logic device also has a transmit mode of operation. In this mode a predetermined signal is sent to the serial communications controller 14 from the programmable logic device in place of a signal received by the programmable logic device from the connected network, and a signal received by the programmable logic device from the serial communications controller 14 is transferred onto the connected network.

The programmable logic device is implemented in the preferred embodiment by a model 22V10 device (such as the model 22V10 Programmable Array Logic (PAL) device from Advanced Micro Devices) as identified in FIG. 5 by the adapter reference numeral 16. The PAL 16 does two things required for a token ring that the 8530 serial communications controller 14 does not do:

it removes from the ring any frames transmitted by the 8530, and it re-inserts the token on the ring, if necessary, after a frame transmitted from the 8530 has been removed from the ring.

The PAL 16 has the following inputs shown in FIG. 5:

RXD—data signal received from the network

/RXC—clock signal received from the network (also connected to the /RTXC pin of the 8530)

FRMSET—signal from the 8530 to indicate whether it is transmitting a frame; it is provided via the /RTS pin on the 8530

TXD—data signal received from the TXD pin of the 8530 for transfer to the network TXC—clock signal received from the /TRXC pin of the 8530 for transfer to the network /RESET—reset signal from the /DTR-/REQ pin of the 8530.

The RXD and /RXC signals are generated by the 8530 of another station on the ring. They are therefore synchronized. FRMSET is asynchronous and may occur at any time.

The PAL 16 has the following outputs:

RX8530—data signal transferred to the 8530 via the connected RXD pin of the 8530

S0, S1—status and testing signals from the PAL to the /CTS and /DCD pins, respectively, of the 8530

DATA OUT—data signal transferred to the network

CLOCK OUT—clock signal transferred to the network input isolation device 18

The PAL outputs provided to the network are connected directly via the cable 4; however, the PAL inputs received from the network preferably are isolated through a suitable line isolator. In the preferred embodiment shown in FIG. 5, the isolator is an opto-coupler coupler such as a fast dual opto-isolator (e.g., the TI HCPL2630 labeled "18" in FIG. 5)

which isolates the internal RXD and /RXC lines from the network DATA IN and CLOCK IN lines. The opto-coupler 18 has respective inputs for connecting to the network data input line and the network clock input line. It also has an output connected to the respective clock inputs of the serial communications controller 14 and the adapter 16 for communicating the network clock signal thereto, and it has an output connected to the data input of the adapter 16 for communicating the network data signal thereto.

The foregoing describes implementations of components of the preferred embodiment interface 2 and their interconnections with each other and the communications network. The interface 2 also connects to a respective station 4 as illustrated in FIGS. 1 and 2. This connection is made in a known manner whereby the station is connected to other respective pins of the particular 8530 device that is used. These pins are not shown as they are known from published literature on the particular device used (see also page 79 of *Computer Music Journal*, Vol. 18, No. 4 (Winter 1994) and, more generally, pages 47–96 thereof, incorporated herein by reference).

With the structure of the interface 2 having been described, its operation and the method of the present invention as implemented by the circuit of FIG. 5 will next be described.

operation

The network data line starts at "mark" idle state (logical one). In the pass-through start up state of the PAL, the received input on RXD (PAL) is output on RX8530 for transferring (or "echoing") received network signals to the 8530. A 1.0 bit time delay is acceptable. A 0.5 bit time delay is preferable. The received signals on the PAL's TXD and TXC inputs are output by the PAL on DATA OUT and CLOCK OUT, respectively, for transferring these signals from the 8530 to the network. The signal received by the PAL on TXD is typically responsive to what the 8530 received via RX8530. For example, if the RX8530 data is not a token seized by the 8530, the data the 8530 outputs to TXD is the same as what it received via RX8530. If the RX8530 signal is a token that is seized by the 8530, then the data output to TXD is that which the 8530 wants to transmit to the network in response to the seized token. As shown in FIG. 6, this process continues in a looping manner until FRMSET goes high.

Data on the network is framed with an opening flag and a closing flag (back to back frames with shared flags are not permitted in the protocol of the above-described Zeta system so that the PAL 16 can recognize line status). A station can transmit when its interface receives the token (mark idle following the closing flag of a message) or an abort signal (mark idle during the reception of a message). When one of these conditions occurs and there is data to send, the 8530 converts the token to a flag and goes into flag idle until the station starts sending data. At this point, the token has been seized.

When the 8530 starts sending data, it asserts FRMSET. When FRMSET goes high (is asserted), the PAL continues to receive signals from the network via RXD and /RXC; but instead of forwarding the RXD data to the 8530, the PAL sends a predetermined signal to the 8530 to emulate to the 8530 master-slave operation during transmission by the 8530. In the preferred embodiment, the PAL holds RX8530 at mark idle (logical one). This holds the token. The PAL continues to receive over TXD (and TXC as well) and transmit over DATA OUT (and CLOCK OUT as well). FRMSET should remain asserted until the last few bytes of the message, preferably the CRC. When the last byte is sent in the preferred embodiment, FRMSET is released. This causes the PAL to start searching the RXD data from the network for its termination condition.

When FRMSET goes low, the PAL continues to assert mark idle on RX8530 until either of two terminating conditions is detected via its RXD. The continued marking idle is important because the falling edge of FRMSET is asynchronous. Furthermore, when the closing flag of a frame is received from RXD, it may be followed by more flags. The timing of the flag sent over RX8530 and the reversion of RX8530 to follow RXD must be such that the flag sent by RX8530 is immediately followed by the flags on RXD; therefore, it is not permissible to introduce or delete a bit at this transition. The two terminating conditions include:

a) non-flag data followed by a flag coming in on RXD (presumably the closing flag of the just transmitted frame) (a flag can be recognized simply by detecting six consecutive ones; non-flag data can be recognized either by three or more consecutive 0's or by a 0 followed by five or fewer 1's); or b) a token (an abort is recognized as a token, which is a 0 followed by seven 1's).

When either of these terminating patterns is recognized by the PAL, then a flag character (binary 01111110) is sent to the 8530 over RX8530. Then RX8530 reverts to following RXD and the primary "listen" mode loop shown in FIG. 6.

Signals S0 and S1 are used for verifying status of the PAL and for testing.

The foregoing operation can be specifically implemented using the interface shown in FIG. 5 and the PAL program at the end of this specification.

It is to be noted also that the invention can be implemented in other embodiments and implementations. For example, the adapter 16 can be implemented by any means which provides the necessary function, specifically the peer-to-peer/master-slave interface of the preferred embodiment. Such alternative implementations can be hardware or software based (or both) and can include, for example, discrete or integrated circuit logic devices or circuits (of which a programmable logic device is only one type) or a programmed microprocessor.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

```
;------------------------------ PIN Declarations --------------
PIN 1     /rxc                              ; INPUT
PIN 2     rxd                               ; INPUT
PIN 3     frmset                            ; INPUT
PIN 4     txc              COMBINATORIAL    ; INPUT
PIN 5     txd              COMBINATORIAL    ; INPUT
```

-continued

| PIN 6 | /reset | ; INPUT |
|---|---|---|
| PIN 14 | txcout | COMBINATORIAL ; OUTPUT |
| PIN 15 | cntones | REGISTERED ; OUTPUT |
| PIN 19 | s1 | REGISTERED ; OUTPUT |
| PIN 17 | s0 | REGISTERED ; OUTPUT |
| PIN 18 | rx8530 | COMBINATORIAL ; OUTPUT |
| PIN 16 | c2 | REGISTERED ; OUTPUT |
| PIN 21 | c1 | REGISTERED ; OUTPUT |
| PIN 20 | txdout | COMBINATORIAL ; OUTPUT |
| PIN 22 | c0 | REGISTERED ; OUTPUT |
| PIN 23 | flgout | REGISTERED ; OUTPUT |

;------------------------------ Boolean Equation Segment ------
```
STRING NEUTRAL           '/S1 * /S0'
STRING SEEKING_0         ' S1 *  S0'
STRING SEEKING_DATA      '/S1 *  S0'
STRING SEEKING_FLAG      ' S1 * /S0'
STRING COUNT_0           '/C2 * /C1 * /C0'
STRING COUNT_1           '/C2 * /C1 *  C0'
STRING COUNT_2           '/C2 *  C1 * /C0'
STRING COUNT_3           '/C2 *  C1 *  C0'
STRING COUNT_4           ' C2 * /C1 * /C0'
STRING COUNT_5           ' C2 * /C1 *  C0'
STRING COUNT_6           ' C2 *  C1 * /C0'
STRING COUNT_7           ' C2 *  C1 *  C0'
```

EQUATIONS

```
s0.trst=vcc
s1.trst=vcc
c0.trst=vcc
c1.trst=vcc
c2.trst=vcc
txdout.trst=vcc
cntones.trst=vcc
rx8530.trst=vcc
flgout.trst=vcc
txcout.trst=vcc flgout   := /frmset * flgout * /(COUNT_7) * /reset
          + /frmset * SEEKING_FLAG * COUNT_5 * cntones * /reset
          + /frmset * SEEKING_DATA * COUNT_6 * cntones * /reset /c0      := c0                          ; Carry + /flgout * cntones * /rxd    ; Reset to start counting 0's
          + /flgout * /cntones * rxd    ; Reset to start counting 1's ; Reset to start sending the flag
          + /flgout * SEEKING_FLAG * COUNT_5 * cntones
          + /flgout * SEEKING_DATA * COUNT_6 * cntones ; Reset when entering the SEEKING_DATA state
          + /flgout * SEEKING_0 * /rxd ; Hold count at 0 if receiving a 0 at beginning of flag
          + flgout * COUNT_0 * /rxd
          ;Reset counter
          + reset /c1      := c1 * c0                     ; Carry out
          + /c1 * /c0                   ; No carry in + /flgout * cntones * /rxd    ; Reset to start counting 0's
          + /flgout * /cntones * rxd    ; Reset to start counting 1's ; Reset to start sending the flag
          + /flgout * SEEKING_FLAG * COUNT_5 * cntones
          + /flgout * SEEKING_DATA * COUNT_6 * cntones ; Reset when entering the SEEKING_DATA state
          + /flgout * SEEKING_0 * /rxd
          ; Reset counter
          + reset /c2      := COUNT_7                     ; Carry out
          + COUNT_0                     ; No carry in
          + COUNT_1
          + COUNT_2
```

```
                            + /flgout * cntones * /rxd      ; Reset to start counting 0's
                            + /flgout * /cntones * rxd      ; Reset to start counting 1's ; Reset to start sending the flag
                            + /flgout * SEEKING_FLAG * COUNT_5 * cntones
                            + /flgout * SEEKING_DATA * COUNT_6 * cntones ; Reset when entering the SEEKING_DATA state
                            + /flgout * SEEKING_0 * /rxd
                            ; Reset counter
                            + reset cntones := rxd * /reset /s0     := NEUTRAL * /frmset        ; Maintain NEUTRAL
        + SEEKING_FLAG              ; Maintain SEEKING_FLAG ; Transit from SEEKING_DATA to SEEKING_FLAG
                            + SEEKING_DATA * cntones * /rxd * COUNT_0
                            + SEEKING_DATA * cntones * /rxd * COUNT_1
                            + SEEKING_DATA * cntones * /rxd * COUNT_2
                            + SEEKING_DATA * cntones * /rxd * COUNT_3
                            + SEEKING_DATA * cntones * /rxd * COUNT_4
                            + SEEKING_DATA * /cntones * /rxd * COUNT_1

; Transit to SENDING_FLAG (and hence to NEUTRAL)
                            + flgout
                            ;Reset state machine
                            + reset s1      := /flgout * SEEKING_0 * rxd * /reset      ; Maintain SEEKING_0

; Maintain SEEKING_FLAG * /reset
                            + /flgout * SEEKING_FLAG * /cntones * /reset
                            + /flgout * SEEKING_FLAG * COUNT_0 * /reset
                            + /flgout * SEEKING_FLAG * COUNT_1 * /reset
                            + /flgout * SEEKING_FLAG * COUNT_2 * /reset
                            + /flgout * SEEKING_FLAG * COUNT_3 * /reset
                            + /flgout * SEEKING_FLAG * COUNT_4 * /reset
                            + /flgout * SEEKING_FLAG * COUNT_5 * /reset ; Transit to SEEKING_0
                            + frmset * /reset ; Transit to SEEKING_FLAG
                            + /flgout * SEEKING_DATA * cntones * /rxd * COUNT_0 * /reset
                            + /flgout * SEEKING_DATA * cntones * /rxd * COUNT_1 * /reset
                            + /flgout * SEEKING_DATA * cntones * /rxd * COUNT_2 * /reset
                            + /flgout * SEEKING_DATA * cntones * /rxd * COUNT_3 * /reset
                            + /flgout * SEEKING_DATA * cntones * /rxd * COUNT_4 * /reset
                            + /flgout * SEEKING_DATA * /cntones * /rxd * COUNT_1 * /reset rx8530 = cntones * /flgout * NEUTRAL ; Pass data straight through ; Send a flag
                            + flgout * COUNT_1
                            + flgout * COUNT_2
                            + flgout * COUNT_3
                            + flgout * COUNT_4
                            + flgout * COUNT_5
                            + flgout * COUNT_6

; Send continuous 1's
                            + /flgout * SEEKING_0
                            + /flgout * SEEKING_DATA
                            + /flgout * SEEKING_FLAG ; Buffer the clocks out
txcout = txc
txdout = txd ;-------------------------------- Simulation Segment ------------
SIMULATION

;------------------------------------------------------------------------
```

What is claimed is:

1. A communications network interface adapter, comprising:
   means, adapted to be connected to a communications network and to a serial communications controller at a node of the communications network, for transferring network data to the serial communications controller during a receive mode of operation; and
   means, adapted to be connected to the communications network and to the serial communications controller at the node of the communications network, for sending predetermined signals instead of network data to the serial communications controller during a transmit mode of operation.

2. A communications network interface adapter as defined in claim 1, wherein the communications network is a peer-to-peer token ring network and wherein the serial communications controller operates in a master-slave mode.

3. A communications network interface adapter as defined in claim 2, further comprising a programmable logic device programmed to define both said means.

4. An interface for a token ring network, comprising:
   a serial communications controller having a master-slave mode of operation; and
   a programmable logic device connected to said serial communications controller for adapting said serial communications controller to operate on a peer-to-peer token ring network when said serial communications controller operates in said master-slave mode, said programmable logic device having both a receive mode of operation, wherein a signal received by said programmable logic device from a connected token ring network is transferred to said serial communications controller and further wherein a signal received by said programmable logic device from said serial communications controller is transmitted onto the connected network, and a transmit mode of operation, wherein a predetermined signal is sent to said serial communications controller from said programmable logic device in place of a signal received by said programmable logic device from the connected network and further wherein a signal received by said programmable logic device from said serial communications controller is transmitted onto the connected network.

5. An interface as defined in claim 4, wherein:
   said interface further comprises an opto-coupler having respective inputs for connecting to a network data input line and a network clock input line and further having a first output connected to said serial communications controller and said programmable logic device for communicating a network clock signal thereto and still further having a second output connected to said programmable logic device for communicating a network data signal thereto; and
   said programmable logic device has a first output for connecting to a network data output line and a second output for connecting to a network clock output line.

6. A method of communicating a station in a peer-to-peer mode on a token ring network, comprising:
   (a) receiving a signal from a token ring network;
   (b) transferring the received signal to a serial communications controller operating in a master-slave mode;
   (c) receiving a responsive signal from the serial communications controller;
   (d) transmitting the responsive signal onto the token ring network; and
   repeating steps (a) through (d) until a predetermined token defined by a plurality of signals on the network is seized by the serial communications controller, then performing the following steps until the token is passed on by the serial communications controller:
   receiving a signal from the token ring network;
   sending a predetermined signal to the serial communications controller to emulate to the serial communications controller master-slave operation during transmission by the serial communication controller;
   receiving a signal from the serial communications controller; and
   transmitting the signal received from the serial communications controller onto the token ring network.

7. A method as defined in claim 6, wherein the signals of steps (a) and (c) are received by a programmable logic device.

8. A method as defined in claim 6, wherein the predetermined signal represents logic 1.

* * * * *